United States Patent [19]

Peterson

[11] 4,208,104
[45] Jun. 17, 1980

[54] BRACKET SUPPORTED SIDE VIEW MIRROR SYSTEM

[76] Inventor: Soren E. Peterson, 1649 W. 3300 South, Salt Lake City, Utah 84119

[21] Appl. No.: 4,110

[22] Filed: Jan. 17, 1979

[51] Int. Cl.² ............................ G02B 7/18; A47G 1/24
[52] U.S. Cl. ...................................... 350/304; 248/487
[58] Field of Search ............... 350/304, 303, 307, 299; 248/487, 479, 480, 476, 475 R

[56] References Cited

U.S. PATENT DOCUMENTS

| | | | |
|---|---|---|---|
| 2,413,894 | 1/1947 | Sorensen | 350/304 |
| 2,708,086 | 5/1955 | Prutzman | 350/304 |
| 2,764,913 | 10/1956 | Green | 350/304 |
| 2,916,967 | 12/1959 | Husak | 350/304 |
| 3,384,334 | 5/1968 | Malachowski | 248/487 |
| 3,712,715 | 1/1973 | Wagner | 350/304 |
| 3,826,563 | 7/1974 | Davis | 350/304 |
| 4,025,173 | 5/1977 | Schmaedeke | 350/304 |
| 4,156,557 | 5/1979 | Skewis | 350/304 |

*Primary Examiner*—Jon W. Henry
*Attorney, Agent, or Firm*—Lynn G. Foster

[57] ABSTRACT

A side view mirror system, including method and apparatus, the apparatus comprising at least two juxtaposed mirror segments respectively contained in planes disposed at a slight angle in respect to each other to be mounted together upon a vehicle as a side view mirror assembly whereby other vehicles to the rear may be readily viewed by the vehicle driver in one mirror segment and other vehicles in what would otherwise be the "blind spot" may be readily viewed in the other mirror segment.

1 Claim, 5 Drawing Figures

BRACKET SUPPORTED SIDE VIEW MIRROR SYSTEM

BACKGROUND

1. Field of Invention

The present invention relates generally to vehicle mirrors and more particularly to a novel side view mirror system, including method and apparatus, whereby the blind spot is eliminated.

2. Prior Art

Heretofore, the state of the art of vehicle mirrors has taught the advisability, the desirability and appropriateness of a single side view mirror mounted upon a bracket or the like and secured to one or both sides of a vehicle in general alignment with the windshield of the vehicle. Such side view mirrors are adjusted to accommodate a clear view of other vehicles located to the rear. Accordingly, a driver "blind spot" is created just behind and to the side of the vehicle. To cope with the dangers inherent in the existence of the "blind spot", driver training courses universally teach trainees to first look in the rearview mirror, then in the side view mirror and lastly to glance directly over the shoulder into the "blind spot" area before changing lanes, for example. The hazards of the "blind spot" are attested to by the large number of accidents caused by drivers who exercise inadequate care in observing the "blind spot" area.

BRIEF SUMMARY AND OBJECTS OF THE INVENTION

In brief summary, the present invention comprises a novel vehicle side view mirror safety system, comprising method and apparatus, whereby a plurality of mirror segments eliminate the blind spot and simultaneously provide for a clear view of other vehicles to the rear.

With the foregoing in mind, it is a primary object of the present invention to provide a novel vehicle side view mirror system, including method and apparatus.

A further paramount object is the provision of a novel side view mirror system, including method and apparatus, which materially enhances the safety incident to the operation of a vehicle.

A further object is the provision of a novel side view mirror apparatus comprising a plurality of mirror segments which eliminate blind spots and simultaneously provide for a clear view of other vehicles to the rear.

These and other objects and features of the present invention will be apparent from the detailed description taken with reference to the accompanying drawings.

DETAILED DESSCRIPTION OF THE ILLUSTRATED EMBODIMENT

Figure 1:
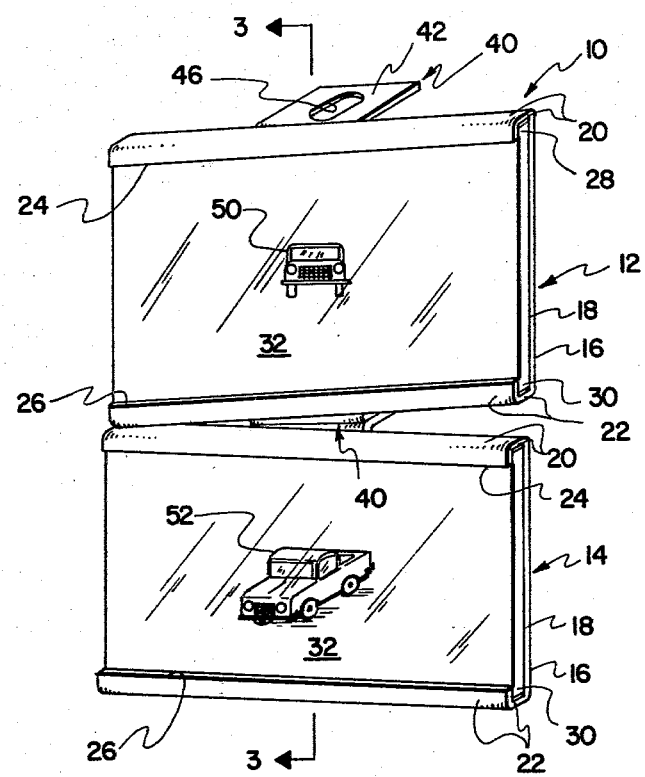
FIG. 1 is a perspective representation of one presently preferred side view mirror assembly according to the present invention.
Figure 2:
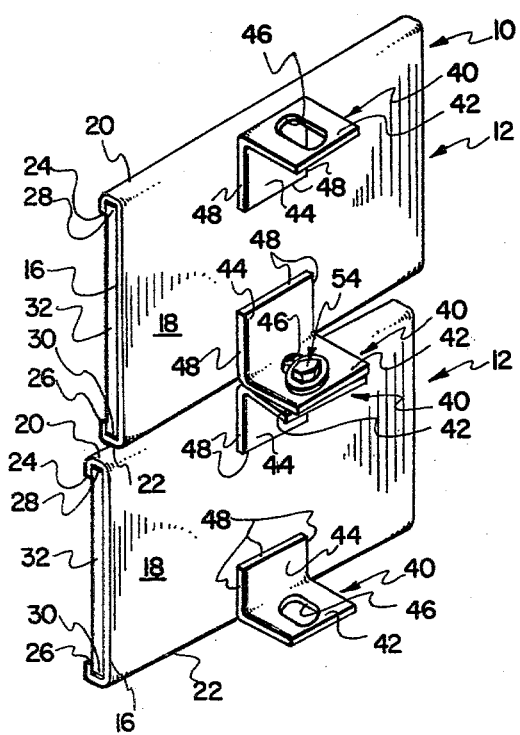
FIG. 2 is a rear elevated perspective representation of the back side of the vehicle side view mirror assembly of FIG. 1.
Figure 3:
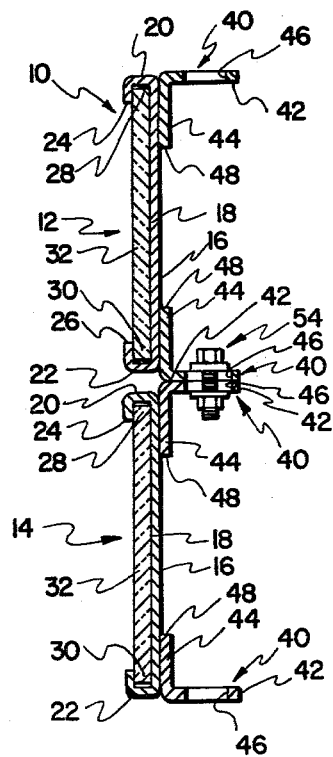
FIG. 3 is a vertical ccross section taken along line 3—3 of FIG. 1.

Reference is now made to the drawings wherein like numerals are used to designate like parts throughout. FIGS. 1–3 illustrate a presently preferred vehicle side view mirror assembly, generally designated 10. Although not shown, the mirror assembly 10 is intended and adapted to be mounted to a vehicle using any suitable available bracket as is well known and commonplace in the art. Since the present invention does not relate to any vehicle mounting bracket per se (but rather to the vehicle side view mirror assembly), no showing or description of any particular type of vehicle mounting bracket is deemed essential to an understanding of the present invention.

The vehicle side view mirror assembly 10 comprises first and second mirror segments generally designated 12 and 14, respectively. While other arrangements may be utilized, it is presently preferred that the mirror segments 12 and 14 be disposed one above the other.

Except for relative orientation and location, mirror segment 12 is illustrated as being identical to mirror segment 14. Accordingly, only one mirror segment need be here described.

Each mirror segment 12 and 14 comprises a frame 16, which has substantial width and is generally C-shaped in cross section, the "C" being reversed as viewed in FIG. 3. While other frames could be used, each frame 16 comprises a rigid planar back 18 and top and bottom reverse bend ends 20 and 22 terminating in opposed edges 24 and 26 respectively. Edges 24 and 26 of the same mirror segment are disposed in a common plane.

The ends 20 and 22 are configured so as to snugly wrap around and securely hold the top and bottom ends 28 and 30 of a planar mirror 32. Mirror 32 has a cross sectional area substantially the same as the cross sectional area of the back 18 of the frame 16. Thus, the mirror 32 is snugly and securely retained within the C-shaped frame 16 in the fashion best illustrated in FIGS. 1 and 3.

While not essential to the present invention, it is presently preferred that each frame 16 be formed of metal. Further, if desired, the mirror 32 may be secured to the associated frame 16 by use of a suitable adhesive or bonding agent.

Top and bottom dog-leg brackets, generally designated 40, are illustrated as being attached top and bottom to the back 18 of each frame 16. The brackets 40, which may be considered part of the overall frame, are centrally disposed and vertically aligned one above the other, although each is inverted in respect to the other, as best illustrated in FIGS. 2 and 3. More specifically, each dog-legged bracket 40 comprises an angle having one slotted leg 42 disposed substantially within a horizontal plane and a vertical leg 44 secured to the associated back 18 as by welding at sites 48 or the like. Each horizontal leg 42 comprises an elongated slot 46, the major axis of which extends substantially perpendicular to the plane containing the associated frame back 18. The slots 46 of both dog-legged brackets associated with each frame 16 are vertically aligned one with the other.

As can be appreciated from an examination of FIGS. 1 and 2, the two mirror segments 12 and 14, when assembled, are skewed one with respect to the other. In other words, the two frames 16 are positioned, in the illustrated configuration, so that the planes containing the two mirrors 32 are disposed at an angle one in respect to the other. This angle is selected so that one mirror 32 is directed toward the rear for observation of vehicles there located. Such a vehicle to the rear is schematically depicted at site 50 in the top mirror 32 in FIG. 1. At the same time, the frame 16 of the other mirror segment is set at such a different orientation that the lower mirror 32 is directed toward what would otherwise be the "blind spot" of the driver of the vehicle to which the mirror assembly 10 is mounted. A vehicle located in what would otherwise be the blind spot is illustrated at site 52 of the lower mirror 32 in FIG. 1.

The skewed relationship of the two mirror segments 12 and 14 is adjustably maintained in the illustrated assembly by a nut and bolt assembly 54 supplemented by top and bottom washers adequate to bridge both slots 46 of the bottom bracket 40 of segment 12 and the top bracket 40 of segment 14. Once tightened, the bolt assembly 54 maintains the selected skewed position. However, in the event an adjustment in the relative positions of the two mirrors is needed, the bolt assembly 54 may be readily loosened with conventional tools, the relative positions of the mirrors 32 adjusted, and the bolt assembly 54 once more tightened.

The top bracket 40 of segment 12 and the bottom bracket 40 of segment 14 accommodate mounting of the assembly 10 to a vehicle.

Figures 4, 5:
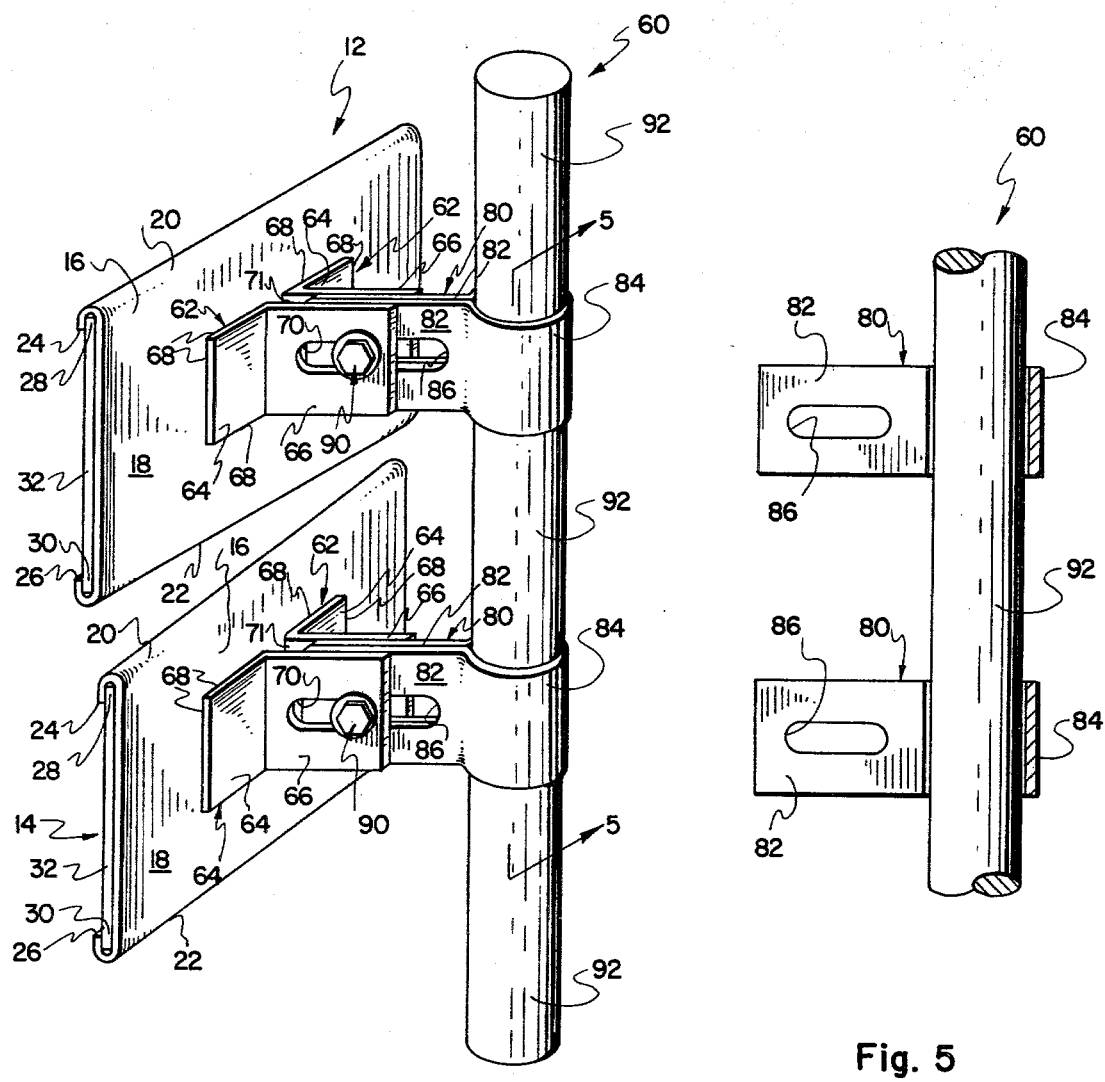
FIG. 4 is a rear elevated perspective of the back side of a second presently preferred side view mirror assembly according to the present invention.
FIG. 5 is a vertical cross section taken along line 5—5 of FIG. 4 with the mirror segments and mounting brackets removed for clarity of illustration.

Reference is now made to FIGS. 4 and 5 which illustrate a second presently preferred vehicle side view mirror assembly, generally designated 60. Although not shown, the mirror assembly 60 is intended and adapted to be mounted to a vehicle using any suitable available bracket as is well known and commonplace in the art. Since the present invention does not relate to any vehicle mounting bracket per se, no showing or description thereof is deemed essential to an understanding of the present invention. Vehicle side view assembly 60 comprises previously described first and second mirror segments 12 and 14. These mirror segments are mounted one above the other in a fashion and for purposes earlier described.

Top and bottom dog-legged right angle brackets, each generally designated 62, are illustrated as being attached to the back 18 of each frame 16 in opposite hand though horizontal alignment one with the other. Each dog-legged bracket 62 comprises an angle having one perpendicularly projecting slotted leg 66 disposed in a vertical plane and a second vertical leg 64 secured to the associated frame back 18 as by welding at sites 68 or the like. Each projecting leg 66 comprises an elongated slot 70, the major axis of which extends substantially perpendicular to the plane containing the associated frame back 18. The two brackets 62 of either mirror segment 12 or 14 are mounted so that the projecting legs are parallel one to the other defining a space 71 of predetermined size ther between.

As can be observed from FIGS. 4 and 5, the two mirror segments 12 and 14 are not directly fastened one to another but are independently mounted upon a vertical bar or rod 92 so as to be angular one in respect to the other to create the previously mentioned skewed relationship accommodating visual observation both to the rear and directly into the blind spot of the vehicle driver. Each mirror segment 12 and 14 is illustrated as being mounted to the bar 92 by use of a U-shaped reverse-turn one piece bracket 80. The bracket 80 accommodates, when in a "loose" condition, relative axial and relative rotational movement in respect to the bar 92. Each bracket 80 comprises parallel ends 82, each defining an elongated slot 86, the two slots 86 of the two contiguous legs 82 being in alignment one with the other. The space 71 between the two angle brackets 62 is sized so as to snugly slidably receive the two juxtaposed legs 82 of the adjacent bracket 80 so that at least part of the two slots 86 is aligned with the two slots 80. A bolt assembly 90 is caused to pass through the aligned open area and when suitably associated with washers on each side and tightened, will cause the associated bracket loop 84 to tightly grip against the rod 92 thereby retaining the associated mirror segment in the selected axial and rotational position. The position of the associated mirror segment may be readily changed by loosening the bolt assembly 90 and axially and/or rotationally reorienting the bracket 80 and associated mirror segment followed by tightening of the bolt assembly 90.

It is intended that the rod 92 be used to accommodate mounting of the assembly 60 to a vehicle. It is to be appreciated that the orientation of the mirrors illustrated in FIG. 4 is the reverse of the orientation depicted in FIGS. 1 and 2, i.e. the bottom mirror segment 14 of the mirror assembly 60 is set to observe vehicles to the rear, while the segment 12 of assembly 60 is set to observe vehicles in the "blind spot".

The invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A vehicle side view mirror assembly comprising:

two spaced mirror segments, one vertically disposed above the other, each mirror segment being contained in a substantially vertical plane, the two planes being disposed at a small acute angle one in respect to the other;

each mirror segment comprising a frame in which a mirror is securely carried, the two mirror frames being juxtaposed but spaced from each other without direct connection;

first bracket means rigidly and non-adjustably connected to the back of the top mirror frame;

second bracket means rigidly and non-adjustably connected to the back of the bottom mirror frame;

frame means by which the assembly is firmly secured to the outside of a vehicle at the side thereof, the frame means comprising separate cantilever means by which each mirror bracket means are connected to and supported by the frame means;

the separate cantilevered means each defining at least one anchor site spaced a substantial distance from the associated mirror frame about which the associated mirror segment may be independently manually rotated;

whereby one mirror accommodates reflective viewing of other vehicles substantially to the rear and the other mirror accommodates reflective viewing of vehicles substantially in the operator's blind spot.

* * * * *